UNITED STATES PATENT OFFICE.

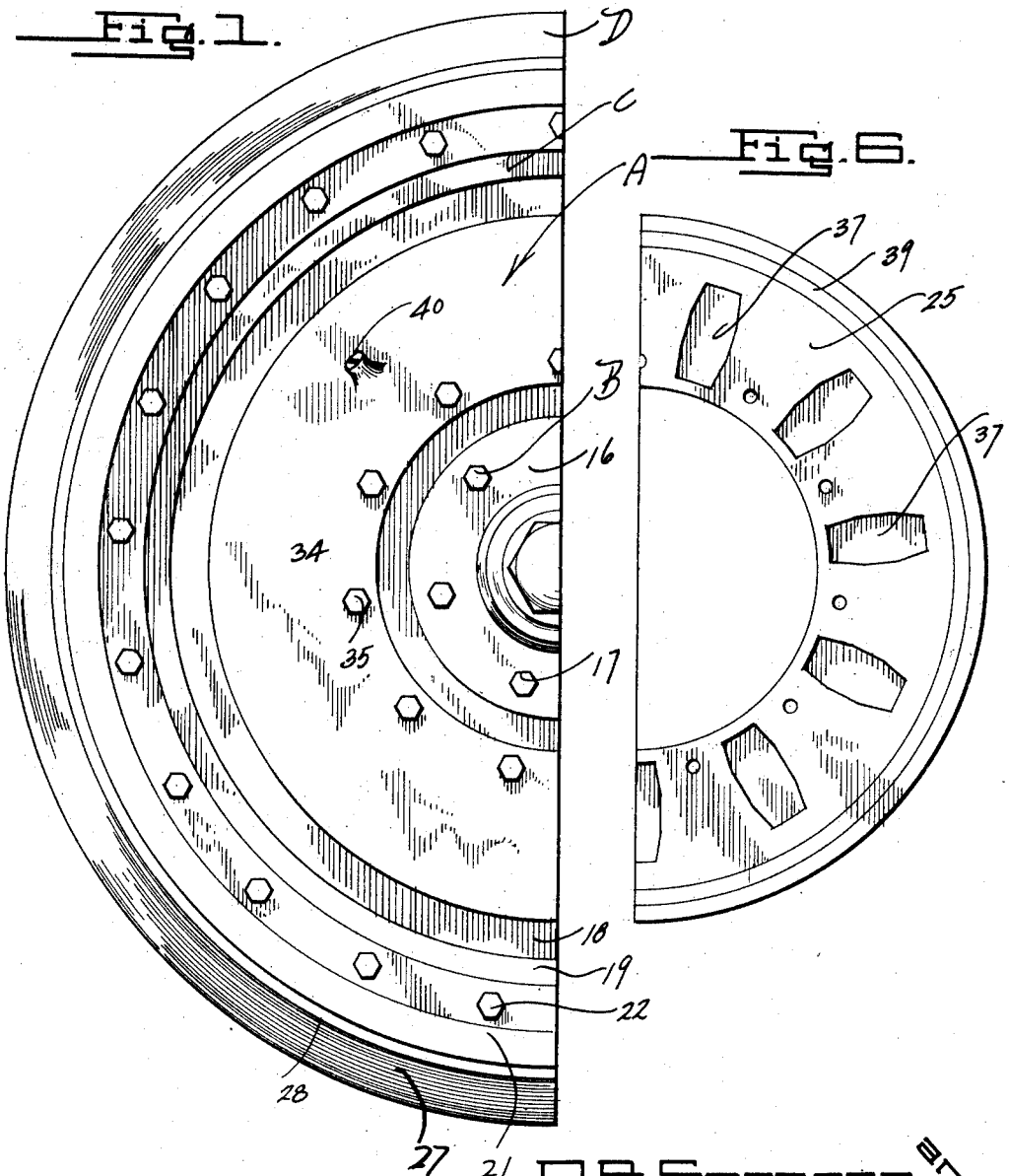

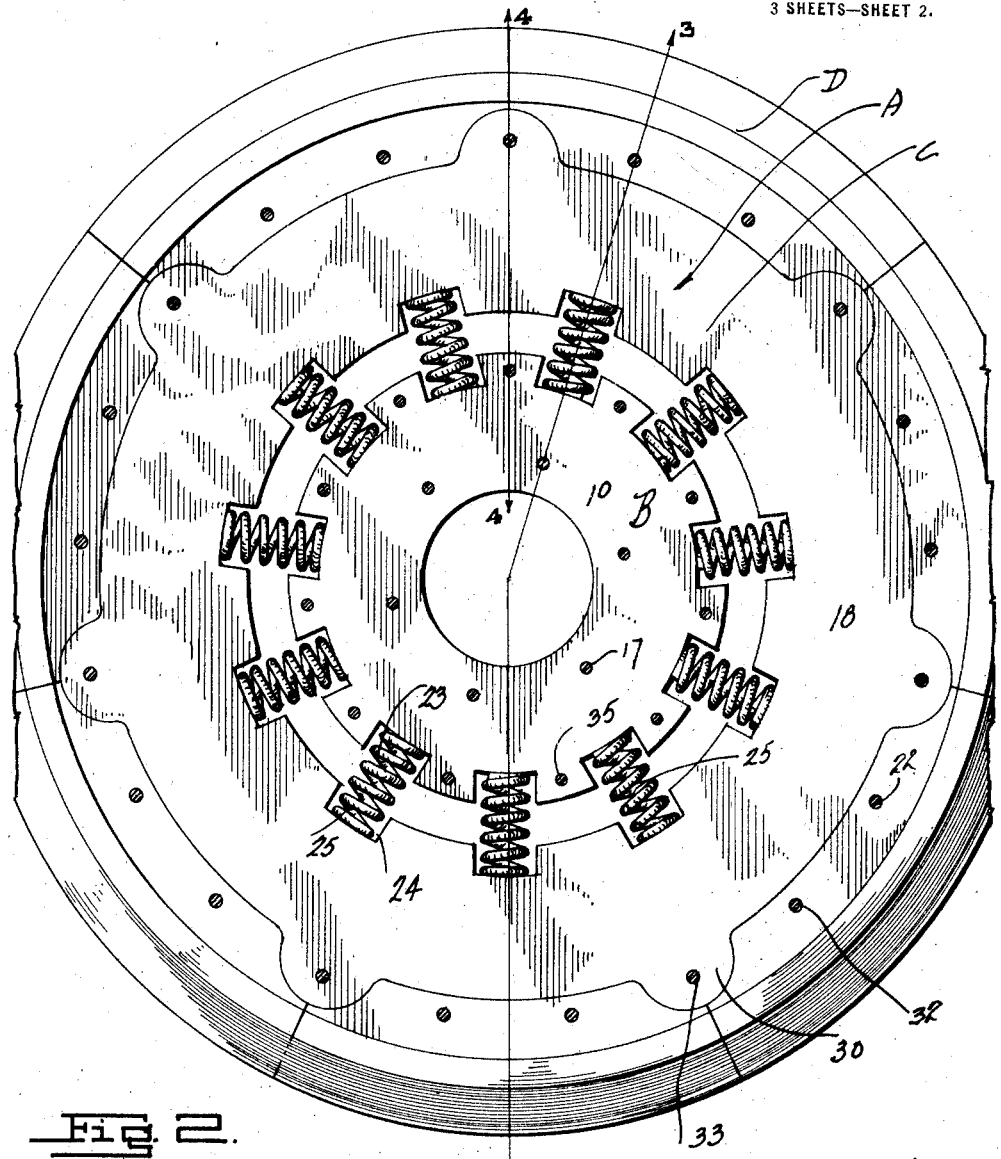

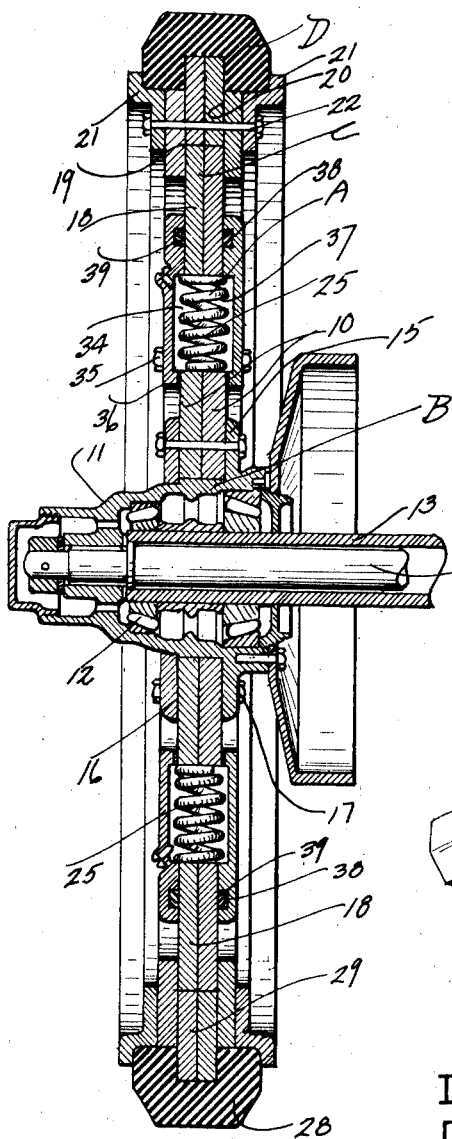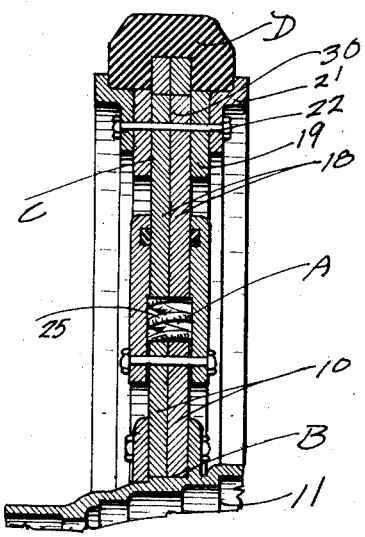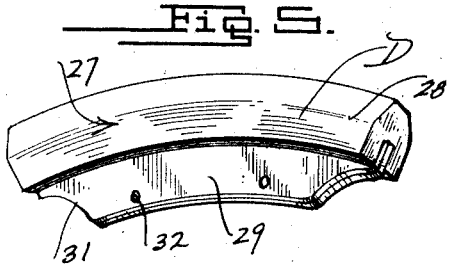

DAVID B. SPENCER AND CORBY W. SPENCER, OF DANVILLE, ILLINOIS.

VEHICLE WHEEL AND TIRE.

1,401,450.  Specification of Letters Patent.  Patented Dec. 27, 1921.

Application filed April 10, 1920. Serial No. 372,887.

*To all whom it may concern:*

Be it known that we, DAVID B. SPENCER and CORBY W. SPENCER, citizens of the United States, residing at Danville, in the county of Vermilion and State of Illinois, have invented certain new and useful Improvements in Vehicle Wheels and Tires, of which the following is a specification.

This invention relates to vehicle wheels, and the primary object of the invention is to provide an improved resilient wheel which will effectively absorb all shock transmitted to the vehicle incident to the travel of the same over a roadway and which will entirely eliminate the use of the ordinary pneumatic tires and thus obviate the inconveniences associated therewith and the expense thereof.

Another object of the invention is to provide an improved vehicle wheel which is particularly adapted for use in connection with motor vehicles and the like which can be effectively used either for a drive or steering wheel.

A further object of the invention is to provide an improved spring wheel embodying a hub section and a rim section, the hub and rim sections being connected together by shock absorbing coil springs, the rim having an improved sectional tire associated therewith.

A further object of the invention is to provide an improved means for constructing the tire for associating the same with the vehicle rim so as to permit a portion of the tire to be readily removed and replaced when worn.

A still further object of the invention is to provide an improved spring wheel for motor vehicles of the above character which is durable and efficient in use, one that is simple and easy to manufacture, and one which can be placed upon the market at a reasonable cost.

With these and other objects in view, the invention consists in the novel construction, arrangement and formation of parts as will be hereinafter more specifically described, claimed and illustrated in the accompanying drawings, forming a part of this specification in which drawings:

Figure 1 is a fragmentary side elevation of the improved vehicle wheel.

Fig. 2 is a side elevation of the improved wheel showing the retaining plates for the springs and tire sections removed.

Fig. 3 is a section taken on the line 3—3 of Fig. 2.

Fig. 4 is a fragmentary section taken on the line 4—4 of Fig. 2.

Fig. 5 is a detail perspective view of one of the tire sections, and

Fig. 6 is a fragmentary elevation of one of the retaining plates for the springs, showing the inner surface of the same.

Referring to the drawings, in detail, wherein similar reference characters designate corresponding parts throughout the several views, the letter A indicates the improved spring vehicle wheel which includes the hub section B, the rim section C and the tire D.

The hub section B includes a pair of annular plates 10 which support the inner hub sleeve 11 for the roller or ball bearings 12. The hub as shown is for a drive wheel and bearings 12 engage the axle housing 13 of a vehicle and the drive axle 14 extends exterior of the casing and is secured to the hub sleeve in any preferred manner. The hub sleeve 11 is provided with an annular flange 15 which engages the outer face of one of the hub plates 10.

The opposite face of the hub plate is engaged by an annular retaining ring 16 and the plates 10, flange 15 and the retaining ring 16 are secured together by suitable fastening elements 17.

The rim section C includes a pair of annular plates 18 which are arranged in spaced concentric relation to the annular plates 10 and the plates 18 have secured thereto the outwardly extending side rings 19 which define a channel 20 for the tire D as will be hereinafter more fully described. The rings 19 support the annular clamping rings 21 for the tire and these clamping rings 21 and the rings 19 are held together by suitable retaining bolts or the like 22 which also hold the tires D in position as will be hereinafter more fully described. The inner meeting edges of the plates 10 and 18 have registering notches 23 and 24 formed therein which form seats for the resilient coil springs 25. The coil springs 25 may be of any desired strength or size according to the size of the vehicle with which the wheel is to be associated. The coil springs 25 extend radially from the plates 10. Thus it can be seen that the rim section C may move in relation to the hub section B and thus permit the springs to effectively absorb the shock incident to the travel of the vehicle over the road which would otherwise be transmitted to the vehicle body.

The tire D comprises a plurality of arcuate sections 27 each of which includes a solid arcuate rubber cushion 28 having the depending fastening flanges 29 which are adapted to be inserted in the channel 20. The plates 18 are provided at equi-distantly spaced points around the circumference of the rim with curved projections 30 which extend into the channel 20. The edges of the retaining or fastening flanges 29 are curved as at 31 so as to conform to the configuration of the projections 30 and when the tire sections are placed in position on the rim certain of the bolts 22 extend through the flanges 29 which are provided with openings 32 for the reception of the same while other of the bolts extend through the projections 30 which are provided with openings 33 for the reception of the same.

Thus it can be seen that when any one of the tire sections become worn, the same can be quickly and easily removed without affecting any one of the other tire sections in any way whatsoever.

The clamping rings 21 engage the outer surface of the rubber cushions 28 and hold the same in place.

Annular housing plates 34 are secured to the opposite faces of the plates 10 adjacent to the outer edge thereof by suitable retaining bolts 35. If so desired packing strips 36 may be positioned between the plates 10 and the housing plates 34 for a purpose which will be hereinafter more fully described. The inner surfaces of the housing plates 34 are provided with spaced notches 37 which form pockets for the outer surface of the coil springs 25. The space between the rim section C and the hub section B is adapted to be filled with a suitable grease, and the inner surfaces of the housing plates 34 are provided with annular grooves 38 in which are positioned annular flexible packing strips 39 which are adapted to engage the outer face of the plates 18. Thus it will be seen that the annular packing ring 39 and strips 36 will prevent the leakage of the lubricant from between the plates 10 and the plates 18. The housing plates 34 carry removable closures 40 which form means whereby the grease or lubricating material may be readily placed in the spaces between the rim section and hub section.

From the foregoing description it can be seen that an improved spring wheel is provided which is of exceptionally durable and simple construction and which will effectively absorb all shock transmitted thereto.

Changes in details may be made without departing from the spirit or scope of the invention; but,

We claim:

1. The combination with a wheel including an annular rim body, rings secured to the opposite faces of the body and extending beyond the periphery thereof defining a channel, outwardly extending lugs formed on the body and arranged between said rings, of a tire including a plurality of independent sections, each of the sections having retaining flanges arranged to fit in the space between a pair of adjacent lugs in said channel, and means arranged to engage said rings and said retaining flanges.

2. In a wheel the combination with an annular rim body having a plurality of outwardly extending lugs formed thereon, rings secured to the opposite faces of the body and extending beyond the periphery thereof defining a channel therebetween, the lugs being arranged in the channel, of a tire including independent sections each having an arcuate cushion member and an arcuate retaining flange, the retaining flange being adapted to fit in said channel between a pair of said lugs, retaining elements extending through said rings and retaining flanges, and clamping rings carried by the first mentioned rings and arranged to engage the cushion members of the tire.

3. In a vehicle wheel, a tire including a plurality of sections, each of the sections including an arcuate ground engaging body and an inwardly extending relatively narrow attaching flange extending the entire length of the body, the terminals of the flange being notched.

DAVID B. SPENCER.
CORBY W. SPENCER.